United States Patent
Kwon et al.

(10) Patent No.: US 9,170,575 B2
(45) Date of Patent: Oct. 27, 2015

(54) FACILITIES CONTROL SYSTEM AND OPERATING METHOD OF THE SAME

(75) Inventors: Dohyung Kwon, Seoul (KR); Sangchul Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 303 days.

(21) Appl. No.: 13/020,232

(22) Filed: Feb. 3, 2011

(65) Prior Publication Data
US 2011/0190943 A1   Aug. 4, 2011

(30) Foreign Application Priority Data
Feb. 4, 2010   (KR) .................. 10-2010-0010630

(51) Int. Cl.
G05B 15/02   (2006.01)
(52) U.S. Cl.
CPC ..................... G05B 15/02 (2013.01)
(58) Field of Classification Search
USPC ........................................ 700/275
See application file for complete search history.

(56) References Cited

U.S. PATENT DOCUMENTS

| | | | |
|---|---|---|---|
| 6,785,592 B1 * | 8/2004 | Smith et al. ................ | 700/291 |
| 7,177,776 B2 | 2/2007 | Whitehead | |
| 2004/0167672 A1 | 8/2004 | McIlhany et al. | |
| 2004/0186599 A1 | 9/2004 | Ahmed et al. | |
| 2008/0262816 A1 | 10/2008 | Lontka | |

OTHER PUBLICATIONS

Salsbury et al., "Performance validation and energy analysis of HVAC systems using simulation", Energy and Building, Elsevier Science, 2000.*
European Search Report issued in EP Application No. 11153030.9 dated Sep. 29, 2011.

* cited by examiner

*Primary Examiner* — Carlos Ortiz Rodriguez
(74) *Attorney, Agent, or Firm* — Ked & Associates, LLP

(57) ABSTRACT

A system and method for controlling one or more facilities based on one or more operation logic parameters is provided. An operation scenario is generated, taking into consideration actual operation of one or more facilities of a particular system, actual control orders, a time interval between data inputs, and other such factors. Operation logic parameters, or algorithms, are then tested based on the generated operation scenario. This system and method may reduce testing time and costs, and may prevent abnormal operation of the facilities of the system.

14 Claims, 3 Drawing Sheets

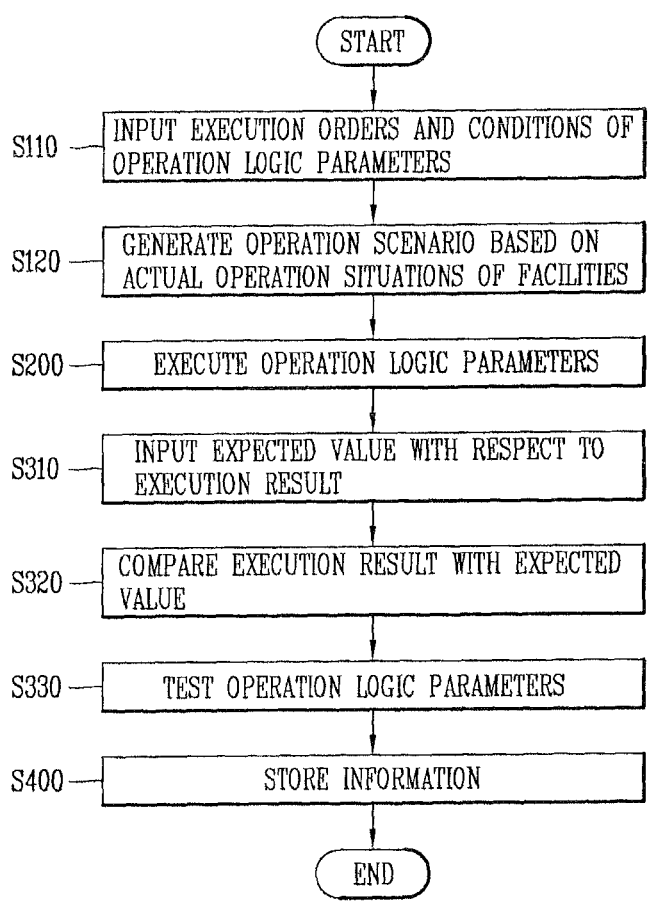

FACILITIES CONTROL SYSTEM AND OPERATING METHOD OF THE SAME

CROSS-REFERENCE TO RELATED APPLICATION(S)

Pursuant to 35 U.S.C. §119(a), this application claims the benefit of earlier filing date and right of priority to Korean Application No. 10-2010-0010630, filed in Korea on Feb. 4, 2010, the content of which is incorporated by reference herein in its entirety.

BACKGROUND

1. Field

This relates to a facilities control system and an operating method of the same.

2. Background

As building facilities become modernized, an automatic control system capable of automatically controlling various building equipment such as power equipment, lighting equipment, air conditioners, disaster prevention equipment, crime prevention equipment and the like is employed. A facilities control system capable of integrally controlling this type of equipment may also be advantageous.

BRIEF DESCRIPTION OF THE DRAWINGS

The embodiments will be described in detail with reference to the following drawings in which like reference numerals refer to like elements wherein:

FIG. 5 is a flowchart of detailed processes of the operating method shown in FIG. 4.

DETAILED DESCRIPTION

Description will now be of various embodiments with reference to the accompanying drawings. Simply for ease of description with reference to the drawings, the same reference numbers will be used to refer to the same or equivalent components wherever possible, and detailed description thereof will not be repeated.

A facilities control system may implemented at a control point for controlling and/or monitoring the facilities and equipments using one or more preset control points. A building engineer may set corresponding control points based on the types of facilities/equipment installed in a particular building, and automatically control the facilities/equipment via the control points using the facilities control system. Such a facilities control system may control facilities and equipment based on operation logic parameters and a corresponding control program.

In such a facilities control system, it may be determined whether or not the operation logic parameters provide for normal operation by setting certain input values. For example, to test operation logic parameters for operating a cooling fan of a chiller when a water discharging temperature is more than 30° C., the actual test may be performed using a water discharging temperature by installing facilities on the spot/localized and then by operating the facilities. In this example, a value of 30° C. may be input to determine whether the operation logic parameters input by the engineer provide for normal operation.

In this situation, the water discharging temperature of the chiller may be affected by various other factors. Accordingly, this type of operation logic testing method may not accurately reflect actual situations in the particular location being tested. For instance, a water discharging temperature of a chiller is dependent on a driving condition of a load side thereof since the water discharging temperature of the chiller increases when the temperature of the load side increases. Furthermore, when errors occur in the system after installing localized facilities, excessive time and/or cost may be incurred to repair the system, and may ultimately require re-installation of the system.

Figure 1:
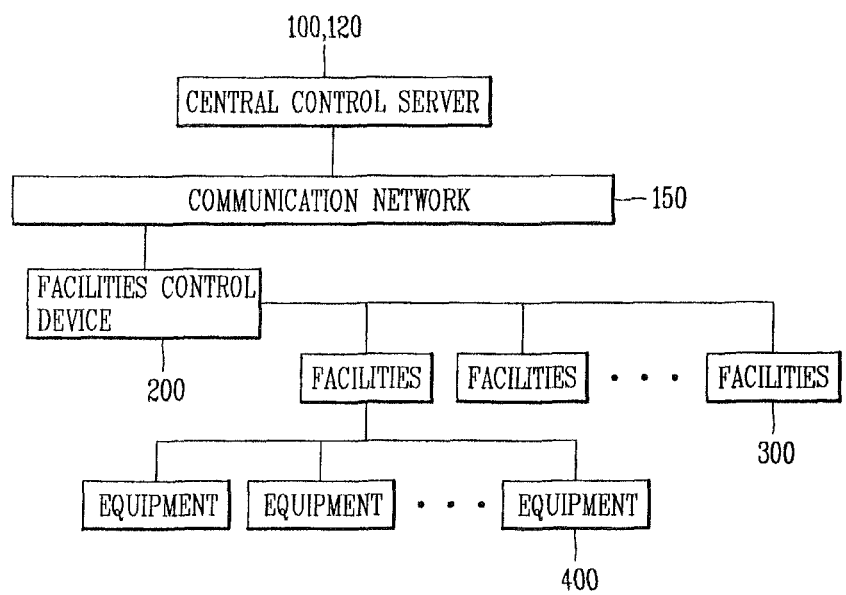
FIG. 1 is a block diagram of a facilities control system as embodied and broadly described herein.
Figure 2:
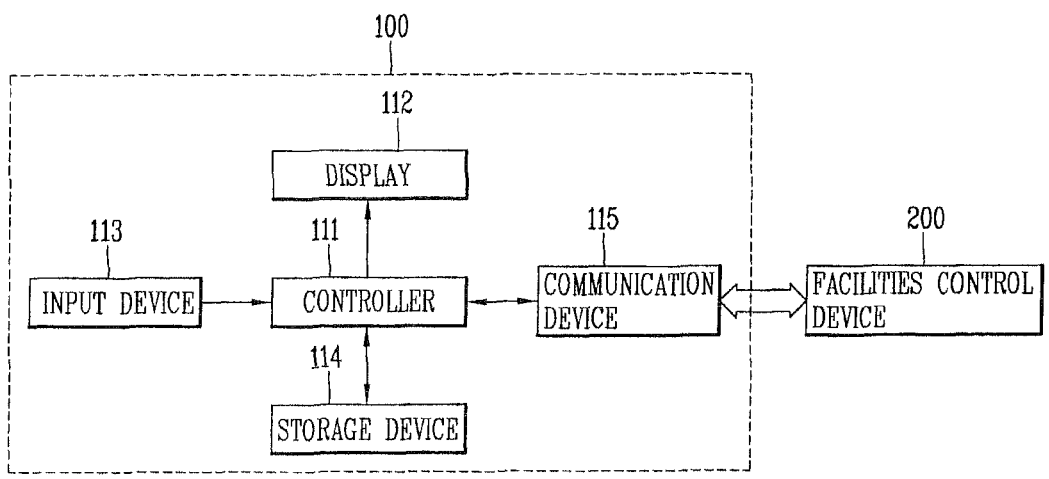
FIGS. 2 and 3 are block diagrams of a central control server and a facilities control device of the facilities control system shown in FIG. 1, in accordance with embodiments as broadly described herein.

Referring to FIGS. 1 and 2, a facilities control system that controls one or more facilities based on one or more operation logic parameters, or operation algorithms, may include a central control server 100 that generates an operation scenario based on actual operation situations of the facilities 300 according to the operation logic parameters, and that tests the operation logic parameters based on the operation scenario.

The facilities 300 are essentially utility equipment systems that form a subsystem of the facilities control system. The facilities 300 may include various different types of equipment 400 that provide various utility functions to the building, such as, for example, an air conditioner, a ventilator, a fan, a heater, a chiller, a pump, a temperature/humidity sensor, a refrigerator, a lighting device, a power device, a fire system, a security system, and other such types of equipment as appropriate in a given location. For instance, when a chiller system is implemented as a facility, that facility may include a chiller, a pump, a temperature sensor, and other such equipment needed to allow the chiller system to provide the desired effect in the building. The facilities control system may be implemented at a control point for controlling and/or monitoring operation. For example, a user may monitor and/or control facilities 300 or various different equipment 400 using one or more preset control points. Such control points may provide for monitoring, control, error checking and the like of one or more particular item in a particular facility or equipment.

The central control server 100 may integrally control or monitor an overall situation of a building, and may include additional terminals for each of the individual facilities 300, such as, for example, a machinery facility, a lighting facility, a power facility, an access restriction facility, a disaster prevention facility, a parking management facility, and other such facilities which may require this type of monitoring and/or control. The central control server 100 may share information with a facilities control device 200 through a communication network 150 to automatically control and/or monitor the facilities 300 and related equipment 400 included in the facilities 300 through one or more corresponding control points as appropriate. The central control server 100 may also generate a control program including operation logic parameters for operating the facilities 300, and may then control and/or monitor the facilities 300 based on the generated control program.

Referring to FIG. 2, the central control server 100 may include a controller 111 configured to execute the operation logic parameters based on a particular operation scenario. The central control server 100 may also include a display 112 configured to display operation states of facilities 100 and related equipment 400 included in the facilities 300. The display 112 may display a result of the execution of the operation logic parameters executed by the controller 111, as well as operation states of the facilities 300. In certain embodiments, the display 112 may also include other features, such as, for example, an interface screen for editing the operation scenario and other such inputs as appropriate.

The central control server 100 may also include an input device 113 configured to receive execution orders and conditions of the operation logic parameters. For example, the input device 113 may be configured to receive an expected value with respect to the execution result of a particular operation logic parameter or set of parameters, and the controller 111 may test the operation logic parameters based on a result of a comparison between the actual execution result (received through the input device 113) and the expected value. The central control server 100 may also include a storage device 114 configured to store the operation logic parameters. The storage device 114 may include a read only memory (ROM) (e.g., flash memory) configured to store programs for operating the central control server 100, a random access memory (RAM) configured to temporarily store data for transmission/reception or display, and other such memory types of memory as appropriate.

The controller 111 may generate a control program for controlling one or more of the facilities 300 and one or more pieces of related equipment 400 included in the one or more facilities 300. The control program may include one or more operation logic parameters for operating the facilities 300 and/or related equipment 400. The controller 111 may also check states of the operation logic parameters by controlling the various control points.

A user may input, through the input device 113, a control command for generating operation logic parameters corresponding to each facility, or for generating a control program. If the user then inputs, through the input device 113, an expected value when the operation logic parameters are normally operated, the controller 111 compares the execution result of the operation logic parameters with the expected value so as to check whether the operation logic parameters indicate normal operation.

The facilities control device 200 is connected to the central control server 100 via the communication network 150 so as to receive the operation scenario from the central control server 100, to execute the operation logic parameters based on the operation scenario, and to transmit the execution result back to the central control server 100.

The central control server 100 may also include a communication device 115 configured to transmit the operation scenario to the facilities control device 200, and to receive the execution result of the operation logic parameters from the facilities control device 200. The communication device 115 may control and/or monitor the facilities 300 by transmitting the control program to the facilities control device 200. Alternatively, the communication device 115 control the display 112 to display operation state information of the facilities 300 received from the facilities control device 200.

The facilities control device 200 may be, for example, a direct digital controller that controls the facilities 300 through its connection between the central control server 100 and the one or more facilities 300. The facilities control device 200 may exchange information with the central control server 100 through, for example, the communication network 150, and may control the facilities 300 by receiving the control program and then executing the operation logic parameters included in the control program. The facilities control device 200 may be, for example, a microcomputer that records and stores information related to facilities 300 included in a building, the information including, for example, output data and state information, through preset control points preset corresponding to one or more pieces of equipment 400 of the facilities 300, such as, for example, sensors and manipulation devices, and that controls and/or monitors the facilities 300 based on the operation logic parameters of the control program. That is, the facilities control device 200 may be connected to the central control server 100 through the communication network 150 so as to receive necessary information, may monitor and control various preset control points corresponding to facilities 300 of a building, and may directly control input/output signals of the facilities 300 based on a program provided therein.

The central control server 100, the facilities control device 200, and the facilities 300 may be connected to one another via the communication network 150, such as, for example, TCP/IP (Transmission control protocol/Internet protocol). For the TCP/IP, a redundancy 10 base-T Ethernet switch hub may be employed, which is a communication device that enables information share by connecting the devices one another. A Building Automation & Control Network (BACnet) may be employed as the communication network 150, which provides an international standard of a communication method relating to building automation in a building management system.

Figure 3:
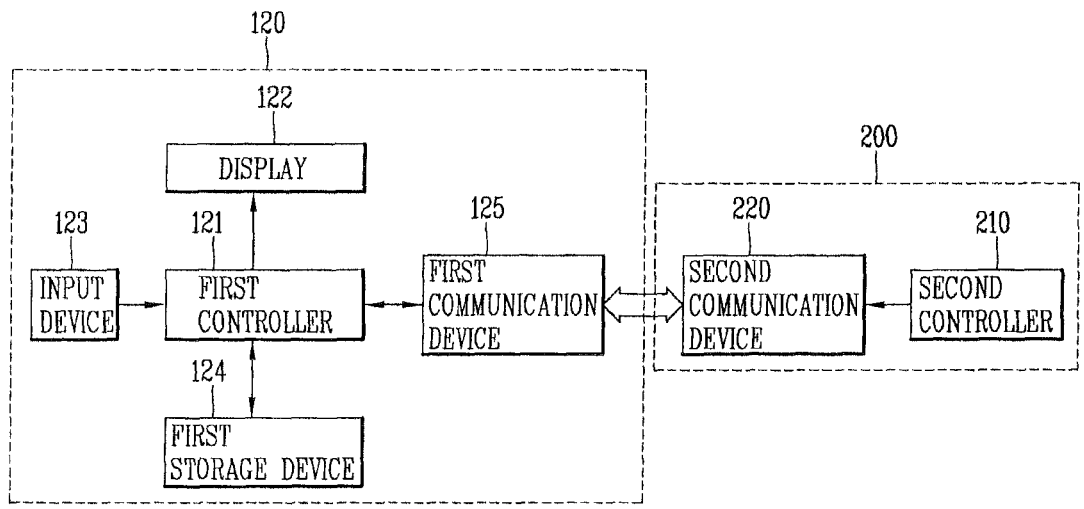

Referring to FIGS. 1 and 3, a facilities control system in accordance with another embodiment as broadly described herein a central control server 120 configured to generate an operation scenario based on actual operation situations of one or more facilities 300 according to one or more operation logic parameters, and to test the operation logic parameters based on the operation scenario, and a facilities control device 200 configured to receive the operation scenario through its connection to the central control server 100, to execute the operation logic parameters based on the operation scenario, and to transmit the execution result to the central control server 100.

The central control server 120 may include an input device 123 configured to receive execution orders and conditions of the operation logic parameters, and an expected value with respect to the execution result. The central control server 120 may also include first communication device 125 configured to transmit the operation scenario to the facilities control device 200, and to receive the execution result from the facilities control device 200, a display 122 configured to display operation states of the facilities 300 and the execution result of the operation logic parameters, and a first storage device 124 configured to store information on at least one of the operation logic parameters, the operation scenario and the execution result. The first storage device 124 may include, for example, a read only memory (ROM) (e.g., flash memory) configured to store programs for operating the central control server 100, and a random access memory (RAM) configured to temporarily store data for transmission/reception or display.

The central control server 100 may integrally control or monitor an overall status of a building, and may include additional terminals for each of the facilities 300 such as, for example, a machinery facility, a lighting facility, a power facility, an access restriction facility, a disaster prevention facility, a parking management facility and other such facilities. The central control server 100 may share information with the facilities control device 200 through the communication network 150, and may be an automatic server for controlling and/or monitoring the facilities 300 and related equipment 400 through one or more control points. The central control server 100 may also generate a control program including operation logic parameters for operating the facilities 300, and may control and/or monitor the facilities 300 based on the control program.

The central control server 100 may also a first controller 121 configured to generate a control program for controlling one or more facilities 300 and one or more related pieces of equipment 400 included in the facilities 300. The first controller 121 may check states of the operation logic parameters by controlling the control points. When the facilities control device 200 is not connected to the central control server 120, the first controller 121 may test the operation logic parameters based on the operation scenario. The first controller 121 may test the operation logic parameters based on the execution result and a comparison result obtained by comparing the execution result with an expected value.

A user may inputs, through the first input device 123, a control command for generating operation logic parameters corresponding to each facility 300, or for generating a control program. If the user inputs, through the first input device 123, an expected value when the operation logic parameters are normally operated, the first controller 121 compares the execution result of the operation logic parameters with the expected value so as to check whether the operation logic parameters are within normal operation.

The first communication device 125 may control and/or monitor the facilities 300 by transmitting the control program to the facilities control device 200. Alternatively, the first communication device 125 may cause the display 122 to display state information of the facilities 300 received from the facilities control device 200.

The facilities control device 200 may include a second communication device 220 configured to receive the operation scenario from the central control server 120, and to transmit the execution result of the operation logic parameters to the central control server 120, and a second controller 210 configured to execute the operation logic parameters based on the operation scenario.

The facilities control device 200 may also include a second storage device configured to store the operation logic parameters of the one or more facilities 300.

The facilities control device 200 may be, for example, a direct digital controller for controlling the facilities 300 via connection between the central control server 120 and the one or more facilities 300. The facilities control device 200 may exchange information with the central control server 120 through the communication network 150, and may control the facilities 300 by receiving the control program and then executing the operation logic parameters included in the control program. The facilities control device 200 may be, for example, a microcomputer for recording and storing information related to facilities 300 of a building, such as, for example, output data and state information, through preset control points of one or more pieces of equipment 400 provided at the facilities 300, such as, for example, sensors and manipulation devices, and for controlling and/or monitoring the facilities 300 based on the operation logic parameters of the control program. That is, the facilities control device 200 may be connected to the central control server 120 through the communication network 150 so as to receive necessary information therefrom, may monitor and/or control the preset control points, and may directly control input/output signals of the facilities 300 based on a program provided therein.

The second communication device 220 may be connected to the first communication device 125 through the communication network 150 so as to receive the operation scenario. The second communication device 220 may also receive a control program and a control command generated by the first control device 121 through the communication network 150.

The second controller 210 may execute individual operation logic parameters by extracting from the operation scenario received from the central control server 120. In this instance, the second communication device 220 transmits, to the first communication device 125, an execution result with respect to the operation logic parameters obtained by the second controller 210.

Figure 4:
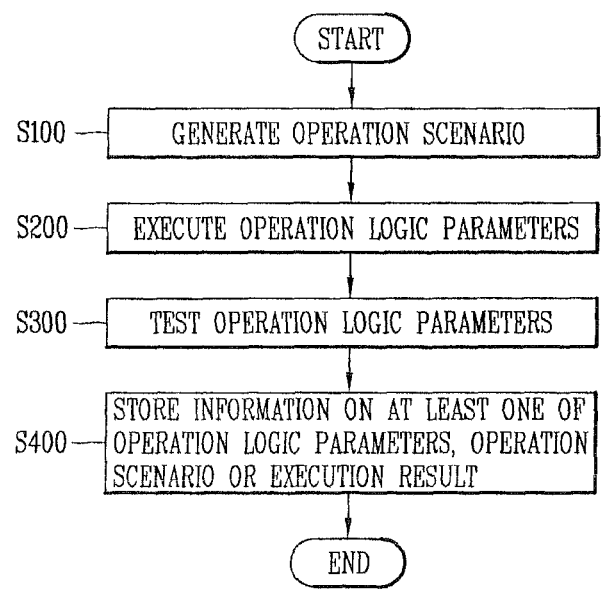
FIG. 4 is a flowchart of an operating method of a facilities control system as embodied and broadly described herein.

Referring to FIG. 4, an operating method of a facilities control system for controlling one or more facilities based on one or more operation logic parameters, as embodied and broadly described herein, may include generating an operation scenario based on actual operation situations of the facilities according to the operation logic parameters (S100), and executing and testing the operation logic parameters based on the operation scenario (S20, S300). Detailed configurations of the respective components will be explained with reference to FIGS. 1 and 2.

Referring to FIGS. 4 and 5, generating the operation scenario (S100) may include receiving execution orders and conditions of the operation logic parameters (S110), and generating an operation scenario based on actual operation situations, such as the execution orders and/or a delayed time (S120). Testing the operation logic parameters (S300) may include receiving an expected value when the operation logic parameters are normally operated (S310), comparing the execution result with the expected value (S320) and testing the operation logic parameters based on the comparison result (S330). Referring to FIG. 4, the facilities control system stores information on at least one of the operation logic parameters, the operation scenario and the execution result (S400).

Referring to FIGS. 4 and 5, an operating method of a facilities control system in accordance with another embodiment as broadly described herein may include generating, by the central control server, an operation scenario based on actual operation situations of the facilities according to the operation logic parameters (S100), executing the operation logic parameters based on the operation scenario by the facilities control device (S200), and testing the operation logic parameters based on the operation scenario by the central control server (S300). The operating method may also include storing, by the central control server, information on at least one of the operation logic parameters, the operation scenario and the execution result (S400). Detailed configurations of the respective components will be explained with reference to FIGS. 1 and 3.

The central control server 100/120 generates an operation scenario, taking into consideration actual operation conditions of the facilities, according to one or more operation logic parameters for controlling one or more facilities (S100). A user may input execution orders and conditions of the operation logic parameters into the central control server 100/120 (S110). The central control server 100/120 transmits the generated operation scenario to the facilities control device 200. The facilities control device 200 executes operation logic parameters with respect to the facilities based on the received operation scenario, and then transmits an execution result to the central control server 100/120. The central control server 100/120 compares an expected value (corresponding to normal operation of the operation logic parameters), with the execution result obtained through the facilities control device 200, thereby testing the operation logic parameters (S300). The central control server 100/120 stores the operation logic parameters of the facilities, the operation scenario, and the execution result obtained through the facilities control device 200.

In a facilities control system and associated operating method as embodied and broadly described herein, an operation scenario may be generated, taking into consideration actual operation situations of the facilities included in the system, actual control orders, a time interval between data inputs, and other such factors, and operation logic parameters may then be tested based on the generated operation scenario. This may reduce testing time and cost, and enhance user convenience.

In a facilities control system and associated method as embodied and broadly described herein, abnormal operation of the facilities included in the system may be prevented by implementation of the tested operation logic parameters.

A facilities control system is provided that has an operation logic testing method based on an operation scenario of the spot, and an operating method of the same.

A facilities control system is provided that is capable of testing operation logics with consideration of actual control orders, a time interval between data inputs, etc., by making actual operation situations of facilities inside a system as a scenario, and an operating method of the same.

A facilities control system for controlling one or more facilities based on one or more operation logics, as embodied and broadly described herein, may include a central control server configured to generate an operation scenario based on actual operation situations of the facilities according to the operation logics, and to test the operation logics based on the operation scenario.

The central control server may include a control unit configured to execute the operation logics based on the operation scenario. The central control server may also include a display unit configured to display operation states of the facilities, or an execution result of the operation logics as well as operation states of the facilities. The central control server may also include an input unit configured to receive execution orders and conditions of the operation logics. The input unit may be configured to further receive an expected value with respect to the execution result, and the central control server may test the operation logics based on a comparison result obtained by comparing the execution result received through the control unit with the expected value. The central control server may further include a storage unit configured to store the operation logics.

A facilities control system in accordance with another embodiment as broadly described herein may include a central control server configured to generate an operation scenario based on actual operation situations of one or more facilities according to one or more operation logics, and to test the operation logics based on the operation scenario; and a facilities control device configured to receive the operation scenario by being connected to the central control server, to execute the operation logics based on the operation scenario, and to transmit an execution result of the operation logics to the central control server.

The central control server may include an input unit configured to receive execution orders and conditions of the operation logics, and an expected value with respect to the execution result; a first communication unit configured to transmit the operation scenario to the facilities control device, and to receive the execution result from the facilities control device; a display unit configured to display operation states of the facilities and the execution result of the operation logics; and a first storage unit configured to store information on at least one of the operation logics, the operation scenario and the execution result. When the central control server is not connected to the facilities control device, the central control server may also comprise a first control unit configured to execute the operation logics based on the operation scenario. The first control unit may be configured to test the operation logics based on a comparison result between the execution result and the expected value.

The facilities control device may include a second communication unit configured to receive the operation scenario from the central control server, and to transmit the execution result to the central control server; and a second control unit configured to execute the operation logics based on the operation scenario. The facilities control device may also include a second storage unit configured to store the operation logics with respect to said one or more facilities.

An operating method of a facilities control system for controlling one or more facilities based on one or more operation logics, as embodied and broadly described herein, may include generating an operation scenario based on actual operation situations of the facilities according to the operation logics; and testing the operation logics based on the operation scenario.

The method may also include executing the operation logics based on the operation scenario. The operating method of a facilities control system may further comprise storing information on at least one of the operation logics, the operation scenario and the execution result.

In a system and method as embodied and broadly described herein, an operation scenario may be generated with consideration of actual operation situations of facilities inside the system, actual control orders, a time interval between data inputs, etc., and then the operation logics may be tested based on the generated operation scenario. This may reduce testing time and costs.

In a system and method as embodied and broadly described herein, the facilities may be operated according to the operation logics suitable for the actual situation of the spot. This may enhance an engineer or user's convenience.

In a system and method as embodied and broadly described herein, a mal-operation of the facilities inside the system may be prevented by using the tested operation logics of the present invention. This may prevent breakdowns, accidents, etc. of the facilities or equipments, and may enhance the stability of the system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A central system that controls a plurality of facilities based on a plurality of operation logic parameters, the system comprising:
   a central control server that generates an operation scenario for at least one of the plurality of facilities based on actual operation situations of the plurality of facilities, wherein the operation scenario includes an execution order among the plurality of operation logic parameters, an execution condition of at least one of the plurality of operation logic parameters, and a time period between when execution of one of the plurality of operation logic parameters is finished and when execution of the other of the plurality of operation logic parameters is started,
   wherein one of the plurality of operation logic parameters is dependent on an attribute of the other of the plurality of operation logic parameters, and
   wherein the central control server comprises:
      a controller configured to execute the plurality of operation logic parameters according to the operation scenario generated by the central control server for simulating control of at least one of the plurality of facilities; and
      an input device configured to receive an expected result of an execution of the plurality of the operation logic parameters for at least one of the plurality of facilities,
   wherein the central control server is configured to confirm at least one of the plurality of operation logic parameters associated with the operation scenarios based on a comparison between the expected result and an actual result of the execution of the plurality of operation logic parameters by the controller.

2. The system of claim 1, wherein the central control server further comprises a display that displays at least one of operation states of at least one of the plurality of facilities, or the actual result of the execution of the plurality of operation logic parameters by the controller.

3. The system of claim 1, wherein the input device receives the execution order, the execution condition and the time period.

4. The system of claim 1, wherein the central control server further comprises a storage device that stores information on each of the plurality of operation logic parameters for at least one of the plurality of facilities.

5. The system of claim 1, further comprising a facilities control device connected between the central control server and the plurality of facilities, wherein the facilities control device receives the operation scenario from the central control server, executes the plurality of the operation logic parameters for controlling the plurality of facilities based on the operation scenarios, and transmits the actual result of the execution to the central control server.

6. The system of claim 5, wherein the central control server further comprises a communication device that transmits the operation scenarios to the facilities control device, and that receives the actual result of the execution from the facilities control device.

7. A facilities control system, comprising:
   a central control server that generates an operation scenario for at least one of a plurality of facilities based on actual operation situations of each of the plurality of facilities, wherein the operation scenario includes an execution order among the plurality of operation logic parameters, an execution condition of at least one of the plurality of operation logic parameters, and a time period between when execution of one of the plurality of operation logic parameters is finished and when execution of the other of the plurality of operation logic parameters is started, wherein one of the plurality of operation logic parameters is dependent on an attribute of the other of the plurality of operation logic parameters; and
   a facilities control device connected between the central control server and the plurality of facilities, wherein the facilities control device receives the operation scenario for at least one of the plurality of facilities from the central control server, executes the plurality of operation logic parameters corresponding to the received operation scenario, and transmits an actual result of the execution of the plurality of operation logic parameters to the central control server, wherein the central control server comprises:
      an input device that receives a first expected result of the execution of the plurality of operation logic parameters; and
      a first controller that confirms at least one of the plurality of operation logic parameters based on a comparison between the actual result and the first expected result.

8. The system of claim 7, wherein the central control server comprises:
   a display that displays operation states of the plurality of facilities and the actual result of the execution;
   a first communication device that transmits the operation scenarios to the facilities control device, and that receives the actual result from the facilities control device; and
   a first storage device that stores information on each of the plurality of operation logic parameters, the operation scenarios and the actual result of the execution.

9. The system of claim 8, wherein the first controller executes the plurality of operation logic parameters for simulating control of at least one of the plurality of facilities based on the operation scenarios when the central control server is not connected to the facilities control device.

10. The system of claim 9, wherein the input device receives a second expected result of the execution of the plurality of operation logic parameters, and wherein the first controller confirms the at least one of the plurality of operation logic parameters based on a comparison between the actual result and the second expected result.

11. The system of claim 7, wherein the facilities control device further comprises:
   a second communication device that receives the operation scenarios from the central control server, and that transmits the actual result of the execution of at least one of the plurality of the operation logic parameters by the facilities control device to the central control server.

12. An operating method of a system for controlling a plurality of facilities based on a plurality of operation logic parameters, the method comprising:
   generating an operation scenario for at least one of the plurality of facilities based on actual operation situation of the plurality of facilities based on the plurality of operation logic parameters, wherein the operation scenario includes an execution order among the plurality of operation logic parameters, an execution condition of at least one of the plurality of operation logic parameters, and a time period between when execution of one of the plurality of operation logic parameters is finished and when execution of the other of the plurality of operation logic parameters is started, wherein one of the plurality of operation logic parameters is dependent on an attribute of the other of the plurality of operation logic parameters;

executing the plurality of operation logic parameters according to the operation scenario by a controller included in the system for simulating control of the plurality of facilities;

receiving an expected result of the execution of the plurality of operation logic parameters; and confirming at least one of the plurality of operation logic parameters based on comparison between the expected result and an actual result of the execution of the plurality of operation logic parameters.

13. The method of claim 12, wherein generating an operation scenario comprises receiving the execution order, the execution condition and the time period.

14. The method of claim 12, further comprising storing information on each of the plurality of operation logic parameters, the operation scenarios or the actual result of the execution of the operation logic parameters.

* * * * *